US009192020B2

(12) United States Patent
Nesensohn

(10) Patent No.: US 9,192,020 B2
(45) Date of Patent: Nov. 17, 2015

(54) ENERGY-EFFICIENT LIGHTING SYSTEM

(75) Inventor: Christian Nesensohn, Gotzis (AT)

(73) Assignee: Tridonic GmbH & CO KG, Dornbirn (AT)

( * ) Notice: Subject to any disclaimer, the term of this patent is extended or adjusted under 35 U.S.C. 154(b) by 274 days.

(21) Appl. No.: 13/820,914

(22) PCT Filed: Aug. 29, 2011

(86) PCT No.: PCT/EP2011/064809
§ 371 (c)(1),
(2), (4) Date: Apr. 18, 2013

(87) PCT Pub. No.: WO2012/031927
PCT Pub. Date: Mar. 15, 2012

(65) Prior Publication Data

US 2013/0193854 A1 Aug. 1, 2013

(30) Foreign Application Priority Data

Sep. 8, 2010 (DE) ........................ 10 2010 040 398

(51) Int. Cl.

| | |
|---|---|
| ***G03B 15/05*** | (2006.01) |
| ***H05B 37/02*** | (2006.01) |
| ***F21S 9/03*** | (2006.01) |
| ***H05B 37/00*** | (2006.01) |
| *F21Y 101/02* | (2006.01) |
| *F21Y 103/00* | (2006.01) |
| *F21Y 113/00* | (2006.01) |

(52) U.S. Cl.
CPC ................ *H05B 37/02* (2013.01); *F21S 9/037* (2013.01); *H05B 37/00* (2013.01); *F21Y 2101/02* (2013.01); *F21Y 2103/00* (2013.01); *F21Y 2113/005* (2013.01)

(58) Field of Classification Search
USPC .................................................. 315/149–159
See application file for complete search history.

(56) References Cited

U.S. PATENT DOCUMENTS 5,032,961 A 7/1991 Pouyanne et al.
5,782,552 A 7/1998 Green et al.

(Continued)

OTHER PUBLICATIONS

English translation of International Search Report issued in connection with the corresponding International Application No. PCT/EP2011/064809 on Nov. 11, 2011.

(Continued)

*Primary Examiner* — Brandon S Cole
(74) *Attorney, Agent, or Firm* — The H.T. Than Law Group

(57) ABSTRACT

The invention relates to a method for improving energy efficiency in a lighting system having at least one light source (3), wherein the light source (3) can be connected to an external electrical energy source, for example the grid, for power supply purposes via an operating device (2). In order to avoid standby losses which arise when the operating device (2) needs to be connected to the grid even in the inactive state in order to generate the necessary runup energy for a semiconductor IC (8) when a switch-on command arrives via the bus, it is proposed that additional electrical energy is recovered from the light from the light source (3) which is not used for lighting purposes or from the direct or indirect light from neighbouring luminaires (2); or from the ambient light by means of photovoltaic energy conversion and is supplied to the operating device as runup energy for the semiconductor IC (8). In this way, the operating device (2) can be isolated from the grid at least during the inactive state.

20 Claims, 1 Drawing Sheet

(56) References Cited

U.S. PATENT DOCUMENTS

| | | | | |
|---|---|---|---|---|
| 7,514,931 | B1 | 4/2009 | Shimotomai et al. | |
| 2006/0002110 | A1* | 1/2006 | Dowling et al. | 362/252 |
| 2006/0022214 | A1* | 2/2006 | Morgan et al. | 257/99 |
| 2008/0265782 | A1 | 10/2008 | Crouse et al. | |
| 2009/0267540 | A1* | 10/2009 | Chemel et al. | 315/297 |
| 2009/0289503 | A1 | 11/2009 | Hayashi et al. | |
| 2012/0235579 | A1* | 9/2012 | Chemel et al. | 315/152 |
| 2013/0193854 | A1* | 8/2013 | Nesensohn | 315/151 |
| 2014/0360561 | A1* | 12/2014 | Meyer et al. | 136/251 |

OTHER PUBLICATIONS

International Search Report issued in connection with the corresponding International Application No. PCT/EP2011/064809 on Nov. 11, 2011.

* cited by examiner

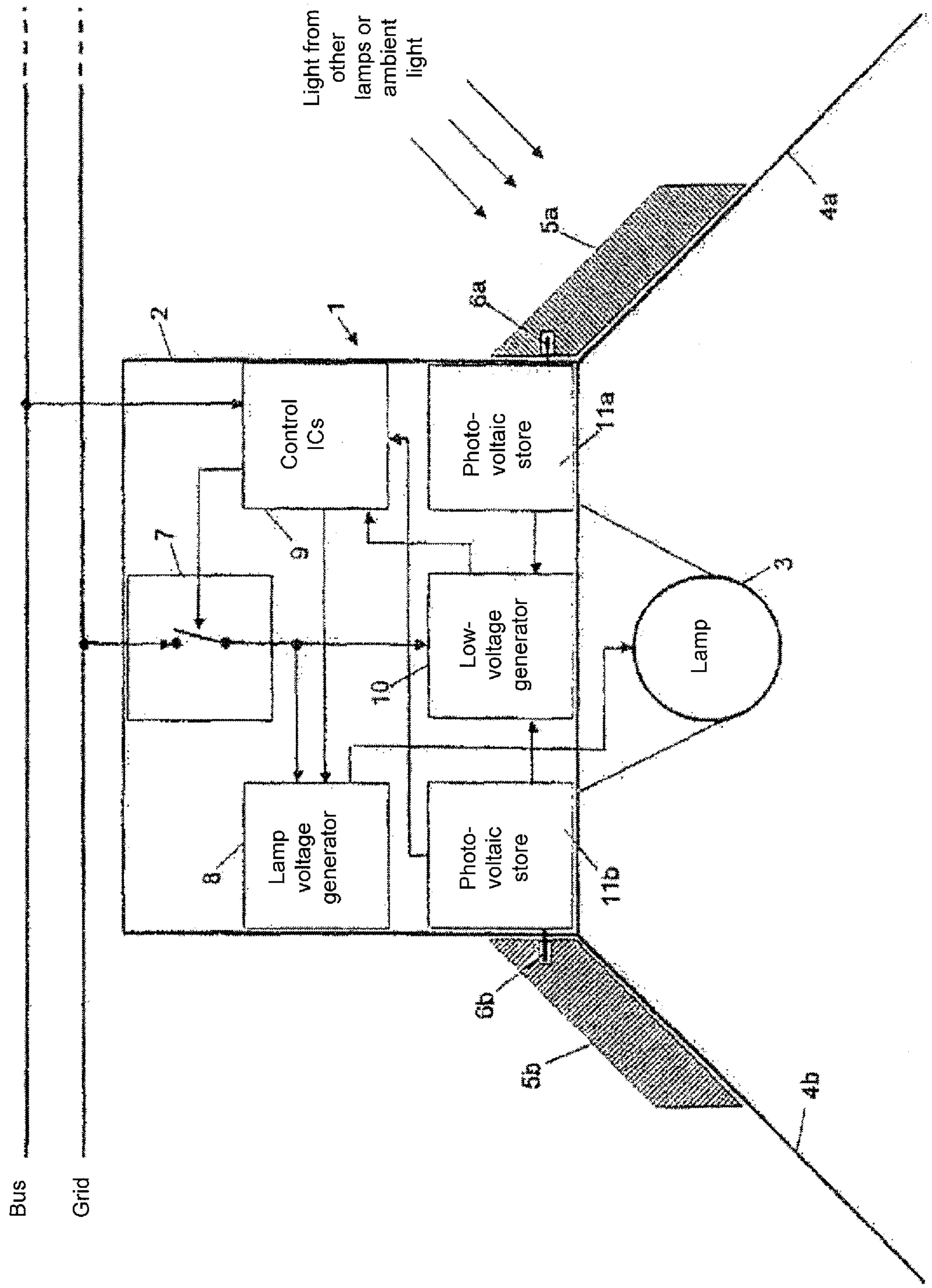
Light from other lamps or ambient light
Bus
Grid
Control ICs
Photo-voltaic store
Low-voltage generator
Lamp
Lamp voltage generator
Photo-voltaic store
1
2
3
4a
4b
5a
5b
6a
6b
7
8
9
10
11a
11b

ENERGY-EFFICIENT LIGHTING SYSTEM

BACKGROUND OF THE INVENTION

The light sources used in lighting systems, for example gas discharge lamps or LEDs, are supplied the appropriate operating voltage or appropriate operating current via operating devices. The operating devices generate the operating voltage or the current from the AC grid or from a DC voltage source. In order to be able to switch on or switch off and dim the light sources separately, the individual operating devices are controllable from a control center via a bus. Each operating device often contains at least one control IC, which, in addition to the control, is also responsible for the communication with the control center and with external sensors etc. Active semiconductor ICs operate on a low voltage of a few volts. This low voltage is often drawn from clocked units during steady-state operation. Before these clocked units can operate properly, a so-called "runup voltage" needs to be present which enables, for example, the startup of the control IC in the operating device, which the result that said control IC can then actuate the clocked units, for example. In order to always provide a runup voltage for the control ICs, the operating devices in bus-controlled lighting systems have until now also been connected to the AC grid in the inactive state, i.e. when the light sources to be supplied by said operating devices are switched off (when the runup energy is recovered by a so-called runup resistor, for example, with the result that corresponding standby losses arise.

SUMMARY OF THE INVENTION

The invention is based on the object of specifying a method for improving the energy efficiency of a lighting system of the above-described type which has at least one light source, as well as a correspondingly configured lighting system.

In respect of the method, the solution is the subject matter of independent claim 1, and in respect of the lighting system, the solution is characterized by the combination of features in independent claim 11.

The central concept of the two solutions consists in that the unused light from the light sources or the natural and/or artificial ambient light (sun, other artificial light sources, . . . ) is converted photovoltaically into electrical energy and this is utilized as additional energy for the operation of the light sources. This concept increases in significance when the light sources are supplied operating voltage by busable operating devices. The photovoltaically generated additional electrical energy can be used for recovering the runup voltage required for a control IC, with the result that, of a plurality of operating devices in the lighting system, at least some can be isolated from the grid when they are set to the inactive state via the bus.

The term "unused (for lighting purposes) light from the light sources" is understood to mean that proportion of the light emitted by the light source which is not used for lighting purposes, for example owing to its emission direction, and would, for example, otherwise be absorbed by component parts of the luminaire and would therefore represent a power loss.

Thus, in each case at least two light sources can be operated in a "master/slave" relationship in such a way that the additional energy generated for the second light source originates at least partially from the first light source.

In this case, although the first light source also remains connected to the external energy source (grid) in the inactive state, accepting standby losses, for the purpose of drawing runup energy, the second light source can then be completely isolated from its external energy source in the inactive state.

In order to recover the additional energy, at least one photovoltaic element can be used. If the light source is equipped with a reflector, the at least one photovoltaic element is expediently arranged at a point on the reflector where the photovoltaic element is best irradiated with direct or indirect light from the actual light source or other light sources or ambient light. For optimum irradiation of the photovoltaic element with light from external sources or with ambient light, the outer side of the reflector is particularly suitable.

It has been shown that the efficiency curve of photovoltaic elements matches well with the spectrum of the light emitted by the gas discharge lamps. However, the use of LEDs as light sources has also proven advantageous because the spectrum of said LEDs can be matched to the efficiency curve of photovoltaic elements by virtue of the selection and combination of differently colored LEDs. To this extent, a light source which is suitable for the purpose envisaged here can be, for example, an LED or a combination of differently colored LEDs or a gas discharge lamp.

The additional energy recovered by photovoltaic energy conversion can be stored in a store. A simple capacitor is suitable for this, inter alia.

A photovoltaic element used for the energy conversion can also perform other functions in lighting systems of the type under consideration here, such as the function of ambient light sensor, motion sensor, control element for dimming the associated light source, and actual value sensor in a control loop for the closed-loop control of the total brightness comprising the light emitted by the light source and the ambient light, for example.

An important separate aspect of the invention also consists in that a common low-voltage energy store is provided for a plurality of light sources or for their operating devices of a lighting system. The energy recovered by photovoltaic energy conversion is stored in this low-voltage energy store. By virtue of a connection to an external energy source (grid), external energy can also be fed in. All of the operating devices are also intended to have capacity for operation without the external energy source (grid). The operating energy within each operating device is merely intended to be drawn from the common low-voltage energy store.

The features of the claims should be included entirely in the content of the disclosure of the description, so as to avoid unnecessary repetition.

An exemplary embodiment of the invention will be described below with reference to the single FIGURE.

BRIEF DESCRIPTION OF THE DRAWINGS

The single FIGURE shows a schematized section through a luminaire with a gas discharge lamp (fluorescent tube) as light source and the units of interest here of the associated operating device.

DETAILED DESCRIPTION OF THE INVENTION

The luminaire 1 comprises an operating device 2, which supplies electrical operating energy to a light source 3 in the form of a fluorescent tube. Meanwhile, the invention also relates to operating devices for, for example, halogen lamps, white or colored LEDs or OLEDs etc.

Two reflectors 4*a*, 4*b* are located on the luminaire 1. Photovoltaic elements 5*a*, 5*b*, which are connected to the operating device 2 via electrical plug-type connections 6*a*, 6*b* are arranged on the upper side of the reflectors.

In the example illustrated, the luminaire 1 belongs to a lighting system with a plurality of such luminaires, but said luminaires are not shown. All of the luminaires can be actuated via a common bus and can be supplied external energy by a common grid line.

The operating device 2 contains an electronic switch 7, via which the operating device 2 can be connected to the grid line.

In addition, the operating device 2 contains a lamp voltage generator, which generates a high-frequency high voltage for the light source 3 from the grid voltage. The lamp voltage generator 8 can be activated or deactivated and possibly dimmed by a control IC 9 contained in the operating device 2. The corresponding control commands are supplied to the control ICs by an external control center via the bus.

In order that the at least one control IC 9 can respond immediately on arrival of a control command, said control ICs require, as runup energy, a low voltage which is drawn by said control ICs from a low-voltage generator 10. Said low-voltage generator normally generates the runup voltage from the grid voltage. For this, it needs to be connected permanently to the grid. This in turn results in corresponding standby losses needing to be accepted.

In order to avoid the latter, the low-voltage generator, so far as possible, draws its energy from two photovoltaic stores 11*a*, 11*b*, which for their part are connected to the photovoltaic elements 5*a*, 5*b* via the electrical plug-type connections 6*a*, 6*b*. The photovoltaic stores 11*a*, 11*b* are capacitors, for example, but it is also possible for other energy stores such as rechargeable batteries, for example, to be used. The photovoltaic elements 5*a*, 5*b* convert light incident on them into additional electrical energy for the operating device 2 or the light source 3. This light is reflected, i.e. in direct light from the light source 3, direct or indirect light from the adjacent light sources or ambient light. Instead of the light source 3, however, other light sources such as LEDs can also be used, for example.

When the photovoltaic elements 5*a*, 5*b* are irradiated with light, the low-voltage generator 10 can be isolated from the gird by means of the switch 7 when the lamp voltage generator 8 is switched so as to be inactive from the control center via the bus. If the command for renewed activation of the lamp voltage generator 8 then arrives, the control ICs can run up immediately since the low-voltage generator 10 is supplied additional energy from the photovoltaic stores 11*a*, 11*b*. This can make it necessary for the photovoltaic elements 5*a*, 5*b* to be irradiated with light at the time of arrival of the renewed switch-on command. When photovoltaic stores 11*a*, 11*b* are used which can maintain the stored energy for a relatively long period of time, the energy stored by the photovoltaic stores 11*a*, 11*b* can also be used directly for providing the runup energy at the time of the arrival of the renewed switch-on command without it being necessary for light to be radiated onto the photovoltaic elements 5*a*, 5*b* at this time.

The energy generated by the photovoltaic elements 5*a*, 5*b* and the energy stored by the photovoltaic stores 11*a*, 11*b* can also be used for feeding the light source 3, i.e. for example for feeding the lamp voltage generator 8. In this case, the feeding of the light source can also take place by means of mixed feeding operation by means of feeding from the grid and from the energy of the photovoltaic elements 5*a*, 5*b*. The energy stored in the photovoltaic store 11*a*, 11*b* can also be used for feeding the light source 3, for example in time-controlled fashion or depending on information, for example a control command received from the outside or information on the grid supply such as energy cost information, for example.

The energy stored in the photovoltaic store 11*a*, 11*b* can, however, also be used in the case of a grid voltage failure for emergency lighting, for example, in which the energy stored in the photovoltaic store 11*a*, 11*b* is used for operating a connected light source (for example by feeding the lamp voltage generator 8) in the event of such a grid voltage failure. The mentioned possibilities for the use of at least partial feeding of the light source by the photovoltaic elements 5*a*, 5*b* or else the use for emergency lighting can be advantageous, for example, in the case of an LED lighting system.

Preferably, in each case two luminaires of a lighting system formed by a plurality of luminaires are operated in a "master/slave" relationship. For this purpose, one of the two luminaires is connected permanently to the grid, while the other luminaire is isolated from the grid by the switch 7 when both luminaires are jointly switched to be inactive via the bus. When the two luminaires are again supplied the command for activation of the lamp voltage generators 8 via the bus, the light source 3 illuminates the "master" luminaire immediately, wherein the low-voltage generator 10 of this luminaire draws its energy from the grid. The "slave" luminaire is only correctly activated, despite the corresponding command, when the light from the "master" luminaire falls on the photovoltaic elements 5*a*, 5*b* of the "slave" luminaire, with the result that the corresponding runup energy for the control ICs 9 is then available in the operating device 2 of the "slave" luminaire. Then, the control ICs 9 of the "slave" luminaire can close the switch 7 again, with the result that the lamp voltage generator 8 starts up and supplies operating energy to the light source 3.

In the above-described version, the photovoltaic elements 5*a*, 5*b* can be removed in the "master" luminaire, which is very simple owing to the plug-type connections 6*a*, 6*b*. In the "slave" luminaire, on the other hand, the switch 7 and the connection between the low-voltage generator 10 and the grid are permanently dispensable. If, however, all of the illustrated elements are provided in a luminaire as has been described in connection with the single FIGURE, the luminaire can be used and programmed in any desired combination with other luminaires. In this case, the main aim is to minimize the standby losses or even to completely avoid the standby losses.

The photovoltaic elements 5*a*, 5*b* can also additionally perform other functions, for example that of ambient light sensor, motion sensor, control element for dimming the associated light source and actual value sensor in a control loop for the closed-loop control of the total brightness comprising the light emitted by the light source and the ambient light.

In a lighting system with a plurality of luminaires of the type described in connection with the single FIGURE, it is also possible for all of the luminaires or their operating devices to have an associated common low-voltage energy store, which can meet the requirements of all the operating devices. If the common energy store still requires additional energy, it can draw this energy from the grid.

The invention claimed is:

1. A method for operating a lighting system having at least one light source (3), wherein the light source (3) is connectable to an external electrical energy source, for power supply via an operating device (2), in which additional electrical energy is recovered from the light from the light source (3) which is not used for lighting purposes or from natural and/or artificial ambient light by photovoltaic energy conversion and is supplied to the operating device to be used there, wherein the additional energy recovered by energy conversion is used for generating a low-voltage supply voltage, which is used as run-up energy for at least one active semiconductor (9).

2. The method as claimed in claim 1, in which, in order to generate the additional energy, one or more photovoltaic elements (5*a*, 5*b*) are used.

3. The method as claimed in claim 1, in which a fluorescent lamp (3), an LED and/or the combination of a plurality of differently colored LEDs is used as light source.

4. The method as claimed in claim 2, in which the additional energy generated by the photovoltaic element (5*a*, 5*b*) is stored in an energy store (11*a*, 11*b*), which then makes available the low-voltage supply voltage.

5. The method as claimed in claim 2, in which a common energy store (11*a*, 11*b*) is used for a plurality of light sources (3) or operating devices (2).

6. The method as claimed in claim 2, in which the photovoltaic element(s) (5*a*, 5*b*) is/are also used as ambient light sensor(s) or motion sensor(s).

7. The method as claimed in claim 2, in which the brightness of the light source (3), which is variable by dimming, is controlled by the photovoltaic element(s) (5*a*, 5*b*) depending on the ambient light.

8. The method as claimed in claim 2, in which the photovoltaic element(s) (5*a*, 5*b*) is also used as actual value sensor for the total brightness comprising the ambient light and the light emitted by the light source (3), in which the actual value for the total brightness determined by the photovoltaic element(s) (5*a*, 5*b*) is compared with a setpoint value and a control deviation is determined, and in which the control deviation is used in a control loop as manipulated variable for setting a dimming value for the light source (3).

9. The method as claimed in claim 1, in which at least one first and one second light source (3) are operated in a "master/slave" relationship such that the additional energy generated for the second light source (3) is generated at least partially from the light from the first light source (3), in which the first light source (3) is also connected to its external energy source in the inactive state, accepting standby losses, for the purpose of drawing runup energy, and in which the second light source (3) is completely isolated from its external energy source (grid) in the inactive state.

10. A lighting arrangement comprising:

at least one light source (3), an operating device (2) for the at least one light source (3), which operating device is connectable to an external energy source, and supplies operating energy to the at least one light source (3), means (10, 11*a*, 11*b*) for generating and storing a low-voltage supply voltage for at least one active semiconductor IC (9) of the operating device, and means (5*a*, 5*b*) for the photovoltaic conversion of the light emitted directly or indirectly by the light source (3) or an adjacent light source (3) and/or of the ambient light into additional electrical energy, wherein the additional energy is supplied to the means (10) for generating and providing a low-voltage supply voltage, wherein the lighting arrangement further comprising means for activating or deactivating the operating device (2), and connecting or isolating means (7) for connecting the operating device (2) to or isolating the operating device (2) from the external energy source, wherein the connecting or isolating means (7) is controllable by the semiconductor IC (9) of the operating device (2), if the additional electrical energy is available for the semiconductor IC (9) of the operating device (2) in such a way that the operating device (2) is isolated from the external energy source in the event of deactivation and that the operating device (2) is connected to the external energy source in the event of activation.

11. The lighting arrangement as claimed in claim 10, wherein the connection between the operating device and the external energy source is maintained permanently if additional energy is not constantly available for the semiconductor IC (8) of the operating device (2).

12. The lighting arrangement as claimed in claim 10, wherein the means (11*a*, 11*b*) for storing a low-voltage supply voltage are formed by a capacitor.

13. The lighting arrangement as claimed in claim 10, wherein the means for the photovoltaic energy conversion are formed by at least one photovoltaic element (5*a*, 5*b*).

14. The lighting arrangement as claimed in claim 13, wherein the at least one light source (3) is surrounded by a reflector (4*a*, 4*b*), and wherein the at least one photovoltaic element (5*a*, 5*b*) is arranged externally on the reflector (4*a*, 4*b*).

15. The lighting arrangement as claimed in claim 13, wherein the at least one photovoltaic element (5*a*, 5*b*) is also used as ambient light sensor or motion sensor.

16. The lighting arrangement as claimed in claim 13, wherein the brightness of the light source (3), which is variable by dimming, is controlled by the at least one photovoltaic element (5*a*, 5*b*) depending on the ambient light.

17. The lighting arrangement as claimed in claim 13, wherein the at least one photovoltaic element (5*a*, 5*b*) is also used as actual value sensor for the total brightness comprising the ambient light and the light emitted by the light source (3), wherein the actual value for the total brightness which is determined by the at least one photovoltaic element (5*a*, 5*b*) is compared with a setpoint value and a control deviation is determined, and wherein the control deviation is used in a control loop as manipulated variable for setting a dimming value for the light source (3).

18. The lighting arrangement as claimed in claim 10, wherein the light source (3) is formed by a gas discharge lamp, by an LED or a combination of a plurality of differently colored LEDs.

19. The lighting arrangement as claimed in claim 10, wherein a common energy store (11*a*, 11*b*) is provided for a plurality of light sources (3).

20. The lighting arrangement as claimed in claim 10, wherein at least one first and one second light source (3) are operated in a "master/slave" relationship in such a way that the additional energy generated for the second light source (3) is generated at least partially from the light from the first light source (3), wherein the first light source (3) is also connected to its external energy source (grid) in the inactive state, accepting standby losses, for the purpose of drawing runup energy, and wherein the second light source (3) is completely isolated from its external energy source (grid) in the inactive state.

* * * * *